United States Patent
Ohtsuka et al.

(10) Patent No.: US 8,359,785 B2
(45) Date of Patent: Jan. 29, 2013

(54) FAN TYPE NOXIOUS INSECT CONTROL APPARATUS

(75) Inventors: Shigeru Ohtsuka, Yonago (JP);
 Kazunori Yamamoto, Hatsukaichi (JP);
 Shinya Kawamura, Hatsukaichi (JP);
 Satoshi Yamasaki, Hatsukaichi (JP)

(73) Assignee: Fumakilla Limited, Tokyo (JP)

( * ) Notice: Subject to any disclaimer, the term of this patent is extended or adjusted under 35 U.S.C. 154(b) by 588 days.

(21) Appl. No.: 12/595,102

(22) PCT Filed: Mar. 31, 2008

(86) PCT No.: PCT/JP2008/056833
 § 371 (c)(1),
 (2), (4) Date: Oct. 8, 2009

(87) PCT Pub. No.: WO2008/132969
 PCT Pub. Date: Nov. 6, 2008

(65) Prior Publication Data
 US 2010/0132246 A1 Jun. 3, 2010

(30) Foreign Application Priority Data
 Apr. 13, 2007 (JP) ................. 2007-105942

(51) Int. Cl.
 *A01M 1/06* (2006.01)
(52) U.S. Cl. .......................... 43/139; 43/138
(58) Field of Classification Search ............ 43/125, 43/139, 138, 107; 422/124
 See application file for complete search history.

(56) References Cited

U.S. PATENT DOCUMENTS 2,551,406 A * 5/1951 Yent ................. 43/127
2,937,419 A * 5/1960 Vaughn ............. 422/119
(Continued)

FOREIGN PATENT DOCUMENTS

DE 202006007498 7/2006
JP 11-028040 A 2/1999
(Continued)

OTHER PUBLICATIONS

EESR dated May 20, 2010 in counterpart European Application No. 08739939.0.

(Continued)

*Primary Examiner* — Christopher P Ellis
(74) *Attorney, Agent, or Firm* — Holtz, Holtz, Goodman & Chick, PC (57) ABSTRACT

A fan type noxious insect control apparatus is disclosed which is desirably used carried on a user's body part and excels in noxious insect control performance. To this end, the apparatus is so configured that air is drawn through an inlet port (6) by driving of an axial flow fan (3) and passed through a chemical carrier (2) carrying a noxious insect control active ingredient to form the air containing such active ingredient, the air being run out through an outlet port (7) to diffuse the active ingredient into the ambient atmosphere and further that the inlet port (6) at an upstream of the fan (3) is open facing axially thereof, the outlet port (7) at a downstream of the fan (3) is open facing radially thereof, and there are provided an annular wall (8) surrounding the fan (3) and an air flow passage (9) communicating between a delivery section of the fan (3) and the outlet port (7) to convert air flowing out of the axial flow fan (3) axially thereof to air flowing radially thereof.

13 Claims, 9 Drawing Sheets

U.S. PATENT DOCUMENTS

| | | | |
|---|---|---|---|
| 4,059,422 A * | 11/1977 | Steiner | 96/147 |
| 4,293,095 A * | 10/1981 | Hamilton et al. | 239/35 |
| 4,432,938 A * | 2/1984 | Meetze, Jr. | 422/49 |
| 4,568,521 A * | 2/1986 | Spector | 422/124 |
| 4,604,245 A * | 8/1986 | Gutierrez | 261/26 |
| 4,630,775 A * | 12/1986 | Mandon et al. | 239/56 |
| 4,666,638 A * | 5/1987 | Baker et al. | 261/26 |
| 4,840,770 A * | 6/1989 | Walz et al. | 422/49 |
| 4,968,456 A | 11/1990 | Muderlak et al. | |
| 5,126,078 A * | 6/1992 | Steiner et al. | 261/26 |
| 5,147,582 A * | 9/1992 | Holzner et al. | 261/30 |
| 5,223,182 A * | 6/1993 | Steiner et al. | 261/26 |
| 5,704,832 A * | 1/1998 | Borrell | 454/157 |
| 6,050,551 A | 4/2000 | Anderson | |
| 6,061,950 A * | 5/2000 | Carey et al. | 43/125 |
| 6,371,450 B1 * | 4/2002 | Davis et al. | 261/26 |
| 6,655,604 B2 * | 12/2003 | Tuttobene, Jr. | 239/6 |
| 6,926,902 B2 * | 8/2005 | Inoue et al. | 424/409 |
| 7,007,861 B2 * | 3/2006 | Ketcha et al. | 239/13 |
| D520,622 S * | 5/2006 | Yamamoto et al. | D23/366 |
| 7,168,630 B1 * | 1/2007 | Ketcha et al. | 239/13 |
| 7,503,668 B2 * | 3/2009 | Porchia et al. | 362/161 |
| 7,651,666 B2 * | 1/2010 | Adair et al. | 422/123 |
| 7,833,492 B2 * | 11/2010 | Schumacher et al. | 422/124 |
| 7,887,760 B2 * | 2/2011 | Yamamoto et al. | 422/124 |
| 7,917,018 B2 * | 3/2011 | Schumacher et al. | 392/390 |
| 8,025,845 B2 * | 9/2011 | Yamasaki et al. | 422/123 |
| 2002/0197189 A1 * | 12/2002 | Lua | 422/124 |
| 2003/0044326 A1 * | 3/2003 | Yamasaki et al. | 422/124 |
| 2003/0175171 A1 * | 9/2003 | Yamamoto et al. | 422/124 |
| 2005/0019165 A1 | 1/2005 | Fujimori et al. | |
| 2006/0039835 A1 * | 2/2006 | Nottingham et al. | 422/124 |
| 2006/0137241 A1 * | 6/2006 | Yamasaki et al. | 43/125 |
| 2007/0183940 A1 * | 8/2007 | Yamamoto et al. | 422/124 |
| 2011/0038761 A1 * | 2/2011 | Saleh et al. | 422/124 |

FOREIGN PATENT DOCUMENTS

| | | |
|---|---|---|
| JP | 2001-197856 A | 7/2001 |
| JP | 2004-024027 A | 1/2004 |
| JP | 2004-024161 A | 1/2004 |
| JP | 2005-124984 A | 5/2005 |
| WO | WO 2004/003391 A1 | 1/2004 |

OTHER PUBLICATIONS

Notification Concerning Transmittal of International Preliminary Report on Patentability, Chapter I of the Patent Cooperation Treaty for PCT/JP2008/056833, 6 sheets.

* cited by examiner

FAN TYPE NOXIOUS INSECT CONTROL APPARATUS

This application is a U.S. National Phase Application under 35 USC 371 of International Application PCT/JP2008/056833 filed Mar. 31, 2008.

TECHNICAL FIELD

The present invention relates to a fan type noxious insect control apparatus which uses a fan to pass air through a chemical carrier carrying a noxious insect control active ingredient and to diffuse such insect control ingredient together with air into the ambient atmosphere.

BACKGROUND ART

So far, various types of fan type noxious insect control apparatus using a fan to pass air to flow through a chemical carrier and to diffuse a noxious insect control active ingredient together with air into the ambient atmosphere have been proposed.

For example, a noxious insect control apparatus of fan type as disclosed in JP H11-028040 A has been proposed.

This fan type insect control apparatus has a chamber provided at one end with an air inlet port and at the other end with an outlet port. The chamber has in its inside a fan adapted to be rotated by a motor and a chemical carrier carrying a noxious insect control active ingredient. When the fan is rotated, air is drawn from the inlet port to be passed through the chemical carrier, and air passed through the chemical carrier as air containing noxious insect control active ingredient is run out of the outlet port to diffuse the insect control active ingredient into an atmosphere.

Also, a noxious insect control apparatus of fan type as disclosed in JP 2001-197856 A has been proposed.

This fan type insect control apparatus includes a chamber and a chemical carrier, a fan, a motor for rotating the fan and a battery which are disposed in the chamber. When the fan is rotated, air is passed through the chemical carrier, and air passed through the chemical carrier as air containing noxious insect control active ingredient is run out through an outlet port to diffuse the insect control active ingredient into the ambient atmosphere while air is drawn into the chamber.

The fan type insect control apparatus disclosed in JP H11-028040 A above has the inlet and outlet ports each of which is open facing axially of the fan and hence they are positioned on a straight line.

Thus, with this fan type insect control apparatus used carried on a one's body part such as waist or hand, the inlet or the outlet port tends to become closed with such body parts with the likelihood that air flow is deteriorated and it is not favorable as a fan type noxious insect control apparatus used on a one's body part.

In the fan type insect control apparatus disclosed in JP2001-197856 A above, air in the ambient atmosphere drawn axially of the fan is passed through the insect control active ingredient to contain such active ingredient and the air is run out radially of the fan for diffusion into the ambient atmosphere, thus in a direction perpendicular to that in which air is drawn therefrom.

Thus, with this fan type insect control apparatus used carried on a one's body part such as waist or hand, the inlet or the outlet port is not likely to be closed with body parts and it is favorable as a fan type noxious insect control apparatus used on a one's body part.

When a noxious insect control performance test was run on these apparatus under the same conditions, however, it was found that the fan type noxious insect control apparatus described in JP 2001-197856 A was inferior in noxious insect control performance to that described in JP H11-028040 A.

It is an object of the present invention to provide a fan type noxious insect control apparatus well adapted for use as carried on a user's body part and which is excellent in noxious insect control performance.

DISCLOSURE OF THE INVENTION

As a result of their zealous experimental investigations carried out to examine comparative merits and demerits in noxious insect control performance of the apparatus mentioned above, the present inventors have found out the following:

To wit, the fan type noxious insect control apparatus disclosed in JP H11-028040 A in which the fan is an axial flow fan and the inlet and outlet port each of which is open facing axially of the fan are positioned on a straight line, allows air to flow with a little flow resistance smoothly from the inlet to the outlet port and air drawn through the inlet port to be smoothly run out of the outlet port. As a result, much of air flows through the chemical carrier while in contact with the noxious insect control active ingredient and hence contains much of the latter so that a superior noxious insect control performance can be achieved.

On the other hand, the noxious insect control apparatus disclosed in JP 2001-197856 A in which the inlet port is open facing axially of the fan is formed through a plane of the chamber and the outlet port facing radially of the fan is formed through the peripheral face of the fan so as to lie opposite to the fan, allows air drawn through the inlet port by the rotating fan to be run out immediately through the outlet port and some of such drawn air to leak out of blade tips of the fan and to be diffused in all directions, causing a reduction in its volumetric efficiency and especially a sharp decrease in its volumetric flow rate. As a result, less of air flows through the chemical carrier while less in contact with the noxious insect control active ingredient and hence contains less of the latter so that an inferior noxious insect control performance can be achieved.

From the foregoing, the present inventors have arrived at inventing a fan type noxious insect control apparatus well adapted for use as carried on a user's body and which is excellent in noxious insect control performance.

In accordance with the present invention, there is provided a fan type noxious insect control apparatus in which air is drawn through an inlet port by driving of an axial flow fan and passed through a chemical carrier carrying a noxious insect control active ingredient to form air containing such noxious insect control active ingredient, the air being run out through an outlet port to diffuse the noxious insect control active ingredient into the ambient atmosphere, characterized in that the inlet port at an upstream of the axial flow fan is open facing axially of the axial flow fan;

the outlet port at a downstream of the axial flow fan is open facing radially of the axial flow fan;

there are provided an annular wall for guiding an air flow of axial flow fan and an air flow passage communicating between a delivery section of the axial flow fan and the outlet port;

the annular wall has an inner peripheral surface for opposing to blade tips of the axial flow fan;

the inner peripheral surface is generally circular in cross section perpendicular to its axis and has an air guide section opposing to the blade tips of the axial flow fan across a clearance; and the air flow passage is configured so as to convert air flowing out of the axial flow fan axially thereof to air flowing radially thereof.

It is preferred that:

the air flow passage have an outer peripheral guide surface and an inner peripheral guide surface radially opposed to the outer peripheral guide surface, the inner peripheral guide surface being continued from a vicinity of a boss of the axial flow fan to the outlet port; and at least one of the outer and inner peripheral guide surfaces be of a shape such that air flows smoothly and without turbulence.

Air discharged out of the axial flow fan to flow axially thereof is thus guided by at least one of the outer peripheral guide surface and the inner peripheral guide surface, flowing smoothly while markedly reducing its flow resistance and thereby permitting a greater amount of air to be discharged to improve the noxious insect control performance.

The inner peripheral surface of the annular wall is preferably formed in a region closer to its inlet side than the air flow guide section with an air intake section in the form of a funnel gradually increasing in diameter towards the inlet port.

This reduces a loss due to vortex generation in a casing boundary layer on the inflow side, permitting air to be delivered smoothly onto the inner peripheral surface of the annular wall and the axial flow fan to enhance the fan efficiency by reduction of the loss, thereby loss, thereby raising the volumetric efficiency of the axial flow fan.

Further, according to the present invention where the inlet port is open facing axially of the axial flow fan and the outlet port is open facing radially of the axial flow fan and where the air containing the noxious insect control active ingredient is discharged in a direction which is different from the direction in which air is drawn and can be discharged radially in all directions, the apparatus is suitable not only as a fan type noxious insect control apparatus that can be used carried on a user's body part such as waist or hand but also as a fan type noxious insect control apparatus that can be used in various indoor or outdoor places and situations.

Also, since the axial air flow of the axial flow fan is promoted by the inner peripheral surface of the annular wall, especially the air guide section, the air drawn is prevented from leaking out of the blade tips and diffusing around them and can much be passed or circulated to flow by the axial flow fan. Also, As the clearance is reduced, a reduction of leakage flow from the fan's blade tip sides to their upstream sides and of vortex generation is brought about, thereby permitting a plenty of air to flow efficiently.

Accordingly, an abundance of air is allowed to come in contact with the noxious insect control active ingredient carried by the chemical carrier, increasing the amount of noxious insect control active ingredient contained in the air flowing through the chemical carrier, thus making the noxious insect control performance excellent.

BEST MODES FOR CARRYING OUT THE INVENTION

Explanation is given of forms of implementations of the present invention, first with reference to FIGS. 1, 2, 3 and 4.

Figure 1:
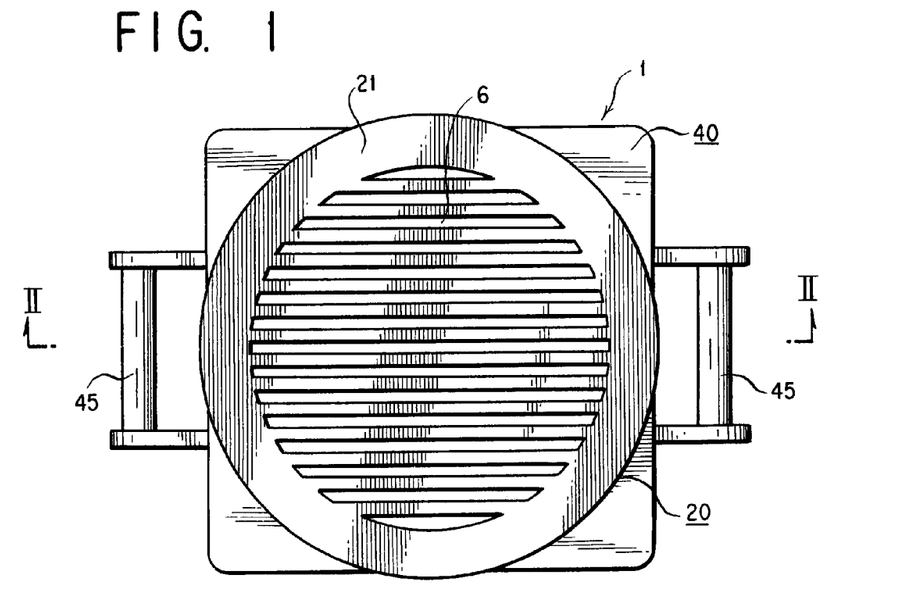
FIG. 1 is a plan view illustrating a fan type noxious insect control apparatus representing a first form of implementation of the present invention.
Figure 2:
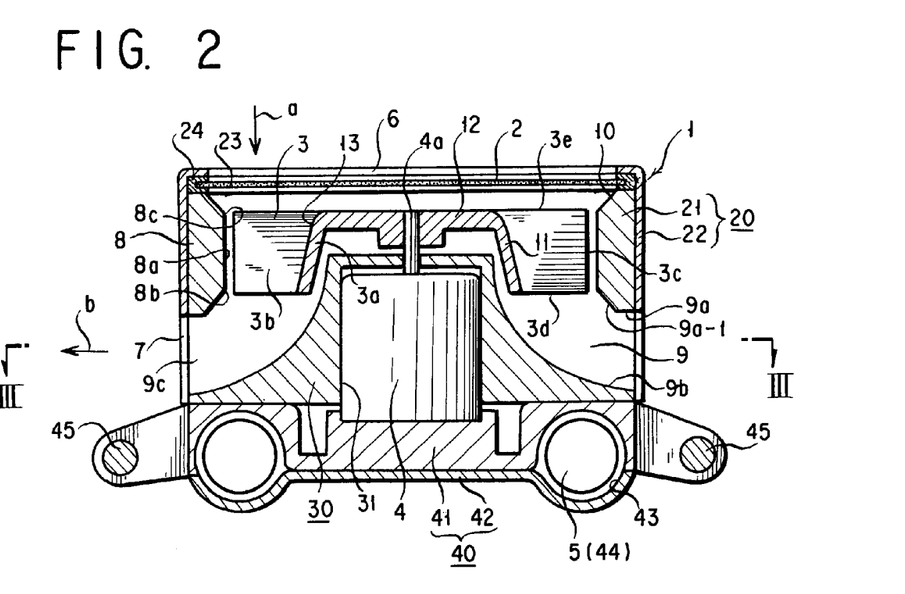
FIG. 2 is a cross sectional view of the apparatus taken along the line II-II in FIG. 1.
Figure 3:
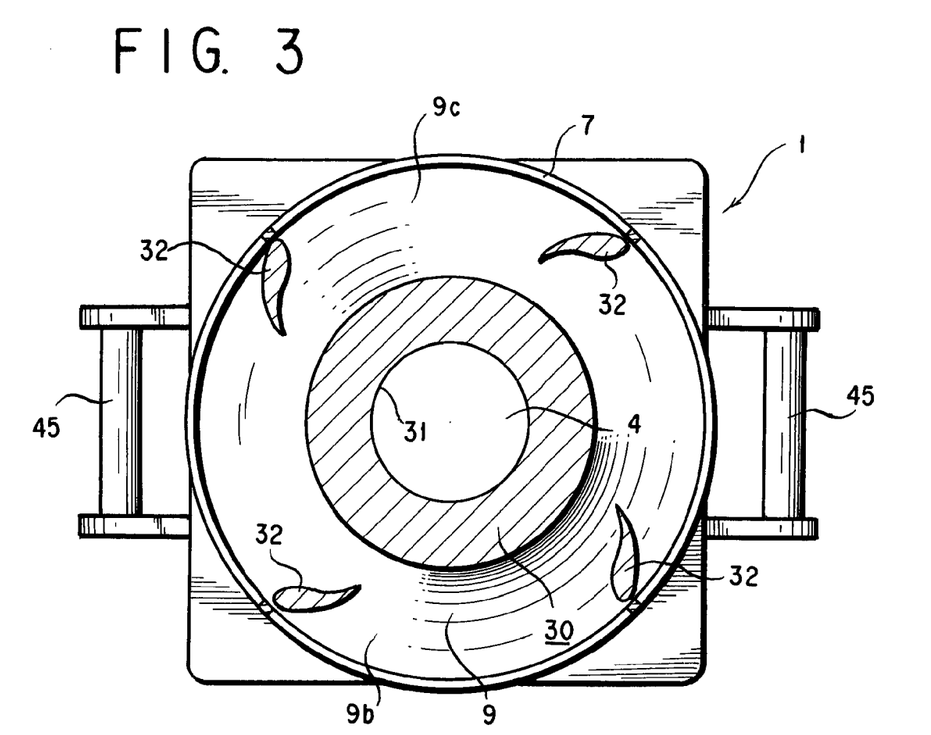
FIG. 3 is a cross sectional view of the apparatus taken along the line III-III in FIG. 2.

A fan type noxious insect control apparatus is made up of an apparatus body 1 and a chemical carrier 2, an axial flow fan 3, a motor 4 and a power supply 5 disposed in the apparatus body 1. The apparatus body 1 is provided with an inlet port 6 and an outlet port 7 and the chemical carrier 2 is positioned upstream of the axial flow fan 3 (at its inlet side).

The inlet 6 port is upstream of the axial flow fan 3 and open facing axially of the fan 3 so that when the axial flow fan 3 is rotated, air from the ambient atmosphere is drawn axially of the fan in a direction indicated by the arrow a.

The outlet port 7 is downstream of the axial flow fan 3 and open facing radially of the axial flow fan 3 so that when the axial flow fan 3 is rotated, the air is passed radially of the axial flow fan 3 to flow out in a direction indicated by the arrow b.

The chemical carrier 2 carries a noxious insect control active ingredient.

Figure 4:
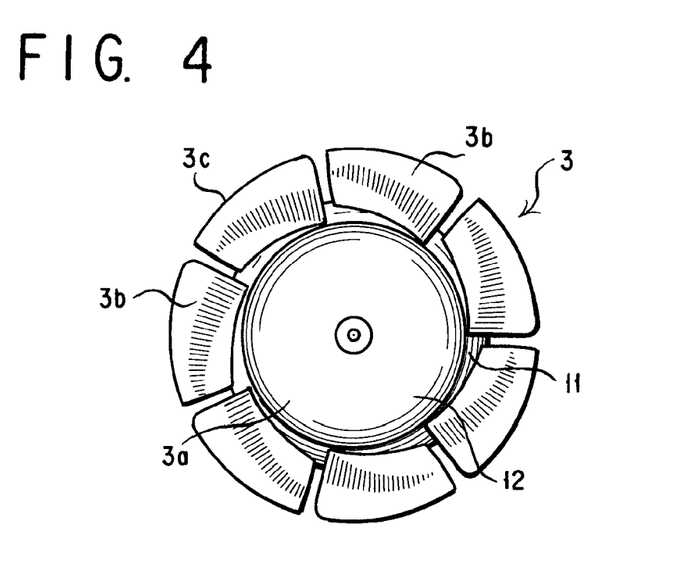
FIG. 4 is a plan view of an axial flow fan.

The axial flow fan 3 has a plurality of blades 3b attached to a boss 3a to extend radially. The boss 3a is coupled to the rotation axis 4a of a motor 4 which is driven to rotate the axial flow fan 3.

The apparatus body 1 is provided with an annular or circular wall 8 for guiding an air flow axial of the axial flow fan 3.

The annular wall 8 has an inner peripheral surface surrounding blade tips 3c (the tips of the blades 3b) for promoting the axial air flow by rotation of the axial flow fan 3.

This inner peripheral surface is generally circular in horizontal cross section (cross section perpendicular to the axis) and provided with an air guide section 8a having a circumferentially continued clearance between the air guide section and the blade tips 3c of the axial flow fan 3.

Since the axial air flow of the axial flow fan 3 is promoted by the inner peripheral surface of the annular wall 8, especially the air guide section 8a, the air drawn is prevented from leaking out of the blade tips and diffusing around them and can much be passed to flow by the axial flow fan 3.

In the absence of the annular wall 8, e.g., if as in the prior art mentioned above the outlet port is formed in opposition to the blade tips of the axial flow fan 3 radially thereof, the air flow tends to leak out of the blade tips of the axial flow fan 3 and to diffuse around them with the result that the air circulated is reduced in amount.

An air flow passage 9 is provided downstream of the axial flow fan 3 (at its delivery side).

The air flow passage 9 communicates between a delivery section 3d of the axial flow fan 3 (at the lower end faces of the blades 3b) and the outlet port 7, and serves as an airflow guide for passing the air delivered from the axial fan 3 to flow into the outlet port 7.

And, as air is discharged out of the axial flow fan 3 to flow axially of the fan 3 and the outlet port 7 is positioned facing radially of the axial flow fan 3, the air flow passage 9 is configured so as to convert the axial flow to the radial flow.

Thus, the axial flow fan 3 is rotated by driving the motor 4, air is drawn through the inlet port 6 to flow in the direction indicated by the arrow a and then passed through the chemical carrier 2 so that the air passed through the chemical carrier 2 contains the noxious insect control active ingredient.

The air containing the noxious insect control active ingredient is guided by the inner peripheral surface of the annular wall 8 to form a flow of such air axial of the fan 3 which enters and flows along the air flow passage 9 so as to be converted to a flow of such air radial of the fan 3 which is then discharged through the outlet port 7.

Since the air containing the noxious insect control active ingredient is discharged in a direction (the direction in which the outlet port 7 is opened) which is different from the direction in which air is drawn (the direction in which the inlet port 6 is opened) and can be discharged radially in all directions, the apparatus is suitable not only as a fan type noxious insect control apparatus that can be used carried on a user's body part such as waist or hand but also as a fan type noxious insect control apparatus that can be used in various indoor or outdoor places and situations.

Also, since an axial air flow by the fan 3 is promoted as guided by the inner peripheral surface of the annular wall 8, especially by the air guide section 8a and the air drawn is prevented from leaking out of the blade tips and from diffusing around, air is allowed by the axial flow fan 3 to flow abundantly.

Accordingly, an abundance of air is allowed to come in contact with the noxious insect control active ingredient carried by the chemical carrier 2, increasing the amount of noxious insect control active ingredient contained in the air flowing through the chemical carrier 2, thus making the noxious insect control performance excellent.

Mention is next made of preferred forms of implementations of various constituents of the apparatus.

The air flow passage 9 has: an outer peripheral guide surface 9a provided at a delivery side on the inner peripheral surface of the annular wall 8, e.g., an outer peripheral guide surface 9a provided to be continued between a delivery side end 8b of the air guide section 8a (its downstream part opposed to the delivery section 3d of the axial flow fan 3) and the outlet port 7 (at its upper edge); and an inner guide surface 9b radially opposed to the outer peripheral guide surface 9a and continued between a vicinity of the boss 3a of the axial flow fan 3 (a top peripheral rim of an intermediate body 30 to be described later) and the outlet port 7 (at its lower edge).

These outer and inner peripheral guide surfaces 9a and 9b are so configured that the flow of air discharge out of the axial fan 3 (air flowing axially of the fan 3) is converted thereby so as to flow radially of the axial fan 3 and that an air flow less in turbulence and smooth results.

For example, their radial section may be of a generally arced shape or a tapered shape comprising one or more straight lines, a combination of a generally arced shape and one or more linearly tapered shape or shapes or a streamline shape.

To wit, if air driven by the axial flow fan 3 to flow axially thereof is converted to flow radially thereof, a loss due to its impact on the downstream end face and a loss due to vortex generation in the boundary layer develop. To reduce such losses as much as possible, directing air towards the directions in which it should flow out by guiding it with the faces whose radial section is tapered or arced allows the impact loss and the loss due to vortex generation to be reduced.

Also, the outer peripheral guide surface 9a that manages air to spread radially serves as a diffuser as well and is great in the effect of pressure recovery without vortex loss in the flow of air (namely, of letting the air to fly over a distance under the pressure).

In this form of implementation, the outer peripheral guide surface 9a is formed closer to the delivery side than the air guide section 8a on the inner peripheral surface of the annular wall 8 (at a section projecting to the delivery side from the delivery side end 8b).

In other words, the inner peripheral surface of the annular wall 8 has the air guide section 8a and the outer peripheral guide surface 9a formed at the delivery side of the air guide section 8a.

The inner peripheral surface of the annular wall 8 is formed on its inlet side with an air intake section 10. For example, the air intake section 10 is formed closer to the inlet side than an inlet side end 8c of the air guide section 8a.

The air intake section 10 is in the form of a funnel becoming gradually larger in diameter towards the inlet port 6 such that air can smoothly be taken from the inlet port 6.

More specifically, the inlet port 6 is larger in diameter than the air guide section 8a and an inner peripheral face in an area projecting towards the side of the inlet port 6 becomes gradually larger in diameter in a tapering manner towards the inlet port 6 from the inlet side end 8c of the air guide section 8a on the inner peripheral surface of the annular wall 8, thus forming the funnel-shaped air intake section 10.

The air intake section 10 may be generally arced.

To wit, configuring the air intake section 10 in radial section to be tapered or arced to suitably set its air inflow angle reduces the loss thereat due to vortex generation in a casing boundary layer on its inflow side, permitting air to be delivered smoothly onto the inner peripheral surface of the annular wall 8 and the axial flow fan 3 to enhance the fan efficiency by reduction of the loss, thereby raising the volumetric efficiency of the axial flow fan 3.

Figure 5A:
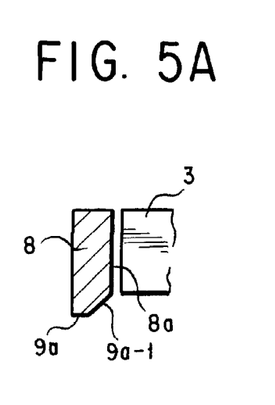
FIGS. 5A-5C are each an explanatory view illustrating a different shape of an annular wall.
Figure 5B:
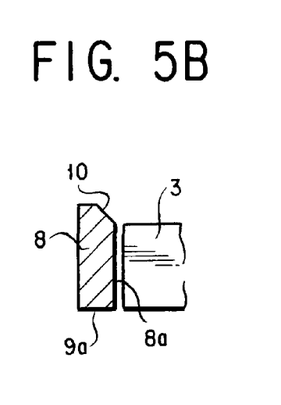
Figure 5C:
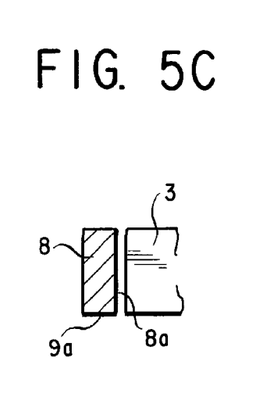

While it is shown that the annular wall 8 on its inner peripheral surface provides the air guide section 8a, the outer peripheral guide surface 9a at its delivery side and the air intake section 10 at its inlet side as mentioned above wherein the outer peripheral guide surface 9a is configured to have a tapered area 9a-1 and the air inlet section 10 is tapered, this is not the limitation. It may be configured to present the air guide section 8a and the outer peripheral guide surface 9a having a tapered area 9a-1 as shown in FIG. 5A, to present the air guide section 8a, the outer peripheral guide surface 9a and the air intake section 10 as shown in FIG. 5B and to present the air guide section 8a whose length is identical to the full length of the annular wall 8 as shown in FIG. 5C.

Also, the annular wall 8 may be configured to provide the air guide section 8a, the outer peripheral guide surface 9a and the air intake section 10 which are formed integrally while the air guide section 8a, the outer peripheral guide surface 9a and the air intake section 10 are formed of materials which are different from one another.

Figure 6:
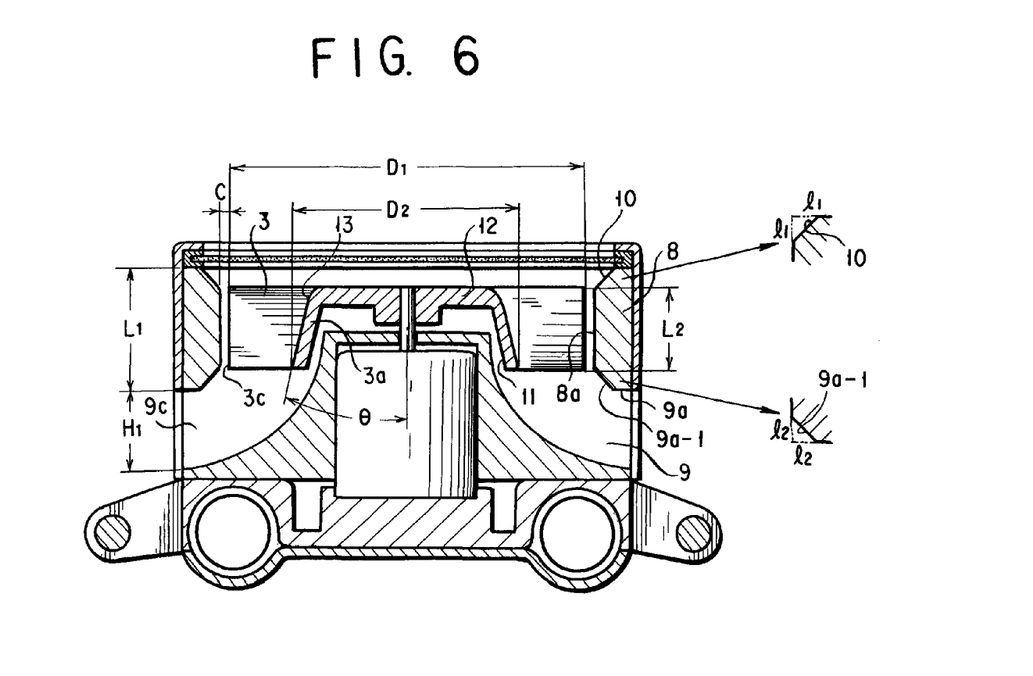
FIG. 6 is an explanatory view illustrating sizes of different parts.
Figure 7A:
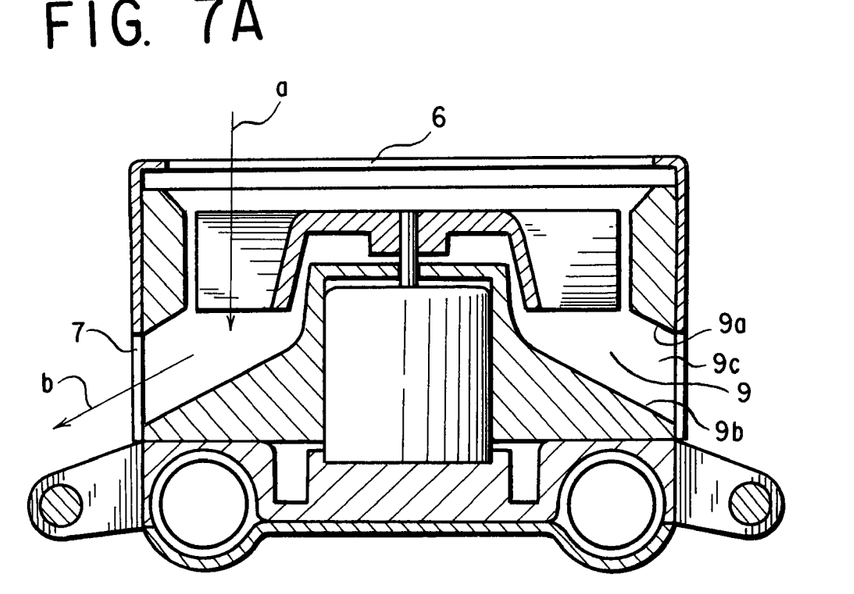
FIGS. 7A and 7B are cross sectional views of such configurations of the apparatus that air is caused to flow out in varied directions.
Figure 7B:
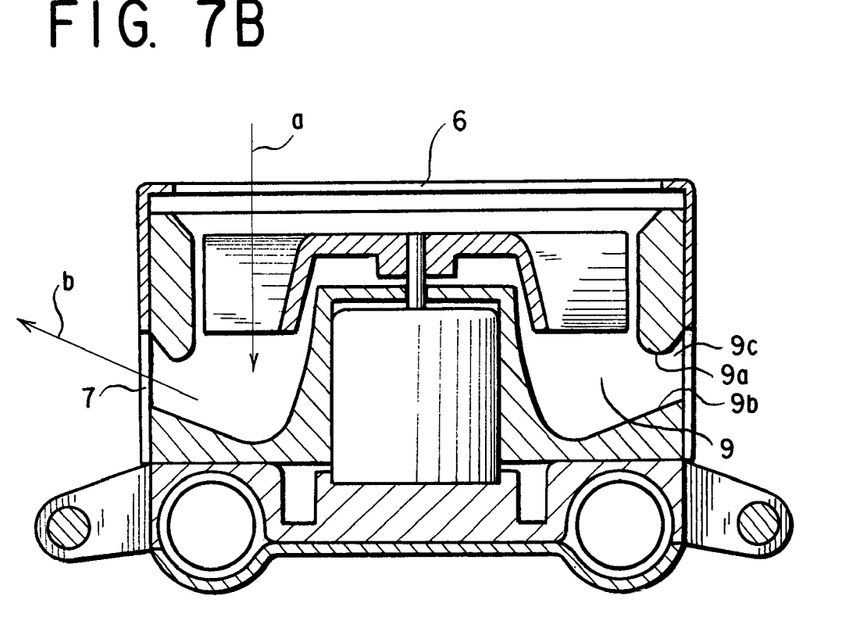

As shown in FIG. 6, the blade tips 3c of the axial flow fan 3 and the air guide section 8a of the annular wall 8a as they come the closest to each other are spaced apart by a clearance whose size is preferably not more than 3% of the outer diameter $D_1$ of the axial flow fan 3. As the clearance is reduced, a reduction of leakage flow from the fan's blade tip sides to their upstream sides and of vortex generation is brought about. While it naturally ought to be infinitely close to zero, causes such as radial run-out of the shaft or forming errors of the annular surface of the fan and its assembling errors make it appropriate that the minimum clearance ranges from 0.5 to 1% of the outer diameter $D_1$ of the axial flow fan 3.

Also, as shown in FIG. 6, the air flow passage 9 has an outlet side section 9c whose size axial of the axial flow fan (height) H1 is preferably from 5% to 40% of the outer diameter $D_1$ of the axial flow fan 3.

Also, as shown in FIG. 6, the annular wall 8 has a length L1 axial of the fan which is preferably from 0.5 to 1.7 time of the axial length L2 of blade tips 3c of the axial fan 3 (fan height).

To wit, in the annular wall 8 the air guide section 8a has a minimum axial length which is ½ of the axial length $L_2$ of the axial flow fan 3 and is preferably opposed to the blade tips 3c between the axial center of the axial fan 3 (at a position of $L_2/2$ from the inlet side end 8c) and its delivery section, namely at the delivery side section which has a half of the axial length of the fan.

And, when configured to have the air guide section 8a, the outer peripheral guide surface face 9a and the air intake section 10, the annular wall 8 has a maximum length which is 1.7 time of the axial length L2 of the axial flow fan 3.

In short, it suffices if the air guide section 8a is opposed to the blade tips 3c at least over the delivery side section which has a half of the axial length of the fan.

The boss 3a of the axial flow fan 3 is in the form of a top closed cylinder having a peripheral wall 11 and a top plate 12 and has the blades 3b attached to the peripheral wall 1 and a rotating shaft 4a of the motor 4 coupled to the top plate 12.

The peripheral wall 11 is tapered becoming gradually larger in diameter from the upstream towards the downstream side and, as shown in FIG. 6, preferably has a taper angle θ of 0.5° to 30°. By imparting to the boss 3a a taper expanding towards the axially downwards, the area of airflow passing through the fan 3 can gradually be reduced in a cross section perpendicular to the fan axis, thereby accelerating the absolute velocity of airflow on a central flow line within the axial flow fan 3. This allows increasing the fan efficiency if the kinetic energy at the downstream side can be recovered in pressure. Especially in the present invention which requires that the axial flow be converted to the radial flow, imparting a taper to the boss 3a is advantageous in reducing the vortex loss while smoothly effecting the conversion.

Joining the peripheral wall 11 and the top plate 12 together, a corner portion 13 is desirably of a smooth shape, e.g., tapered and/or arced shape in its radial section.

Mention is next made of the illustrated fan type noxious insect control apparatus in detail.

The apparatus body 1 comprises an upper body 20, an intermediate body 30 and a lower body 40.

The upper body 20 has an outer cylinder 22 removably attached to an inner cylinder 21, and the inner cylinder 21 has the chemical carrier 2 disposed at its upper end and held by the outer cylinder 22.

The inner cylinder 21 is formed with the annular or circular wall 8.

The outer cylinder 22 is formed with the inlet port 6 and the outlet port 7.

The intermediate body 30 has a motor mounting hole 31. The intermediate body 30 and the inner cylinder 21 are vertically spaced apart from each other and coupled together by a plurality of circumferentially spaced couplers 32 so as to have the blades 3*b* of the axial flow fan 3 positioned and the air flow passage 9 formed between the two bodies.

The outer cylinder 22 has its lower open end fitted with the couplers 32 of the intermediate body 30 and is cut out at its portion close to the lower end to form the outlet port 7.

The couplers 32 for contacting with air flow may each be shaped in the form of a water drop or airfoil in horizontal cross section or in any other such shape which will not impede air flow to serve as a guide vane.

Such guide vanes may also be provided separately of the couplers 32, e.g., on the inner peripheral guide surface 9*b* to enhance the fan efficiency.

Further, the couplers 32 may be spaced apart at a distance such as to prevent fingers from touching the fan externally and from being injured.

The chemical carrier 2 may be in the form of a sheet 23 carrying the noxious insect control active ingredient and held by a retaining frame 24.

This is not the limitation but may be replaced by any suitable, air-permeable receptacle in which numbers of particles carrying the noxious insect control active ingredient are received.

The lower body 40 comprises its body part 41 and cover 42 such that the body part 41 is formed with a battery housing 43 loaded with a battery 44 so as to be held with the cover 42 against coming off.

The lower body 40 is provided at the body part 41 with a pair of band fittings 45 to which a band (not shown) is to be fitted.

The lower body 40 is fastened at the body part 41 to the intermediate body 30 by screws or the like.

Thus, the fan type noxious insect control apparatus shown in FIGS. 1 to 3 can be used by being attached to a user's hand or waist with the use of a band.

Mention is next made of another form of implementation of the present invention.

While in the previous form of implementation, air is discharged through the outlet port 7 in a direction at a 90° to the direction in which air is drawn in, this is not the limitation but air may be discharged in a direction at any other optional angle.

For example, as shown in FIG. 7A the air flow passage 9 may be so configured as to discharge the air in a direction at an angle smaller than the right angle (e.g., 80°).

As shown in FIG. 7B the air flow passage 9 may be so configured as to discharge the air in a direction at an angle larger than the right angle (e.g., 80°).

The direction in which air is discharged through the outlet port 7 can be set according to the purpose for which and the place in which the fan type noxious insect control apparatus is used.

For example, if the apparatus is used carried on a user's waist in which case the inlet port 6 is open horizontally, air can then be discharged along the user's trunk at an angle in a range of 80° to 100°.

Also, if the apparatus is used suspended from the ceiling in which case the inlet port 6 is open vertically, air can then discharged downwards at an angle in a range of 100° to 70°.

Also, if the apparatus is used mounted on the floor, air can then be discharged upwards at an angle in a range of 100° to 160°.

Figure 8A:
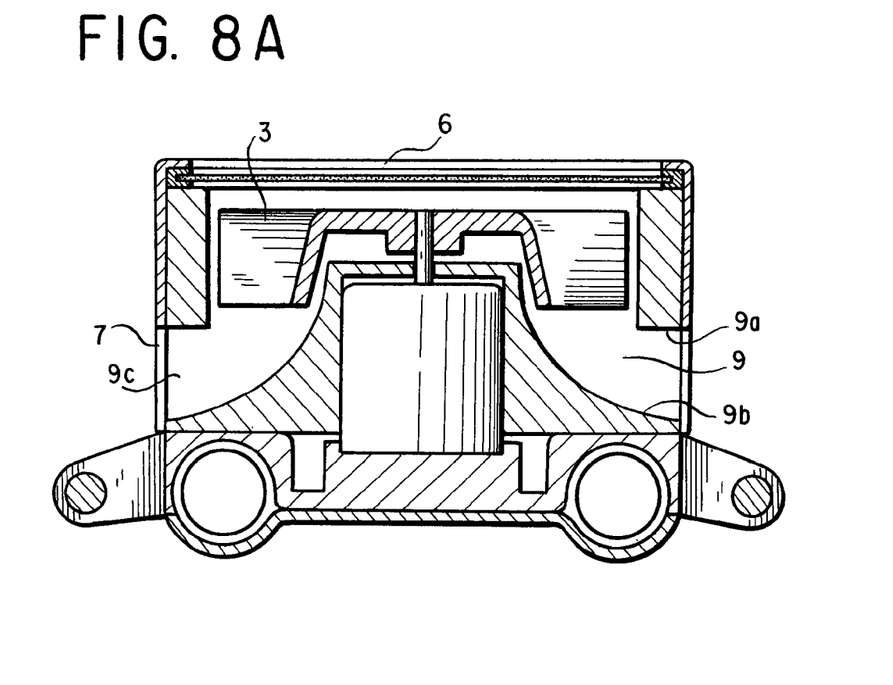
FIGS. 8A and 8B are cross sectional views of different configurations of the apparatus in which air flow passage is varied in shape.

The air flow passage 9 as shown in FIG. 8A may be configured in radial section so that air flows smoothly along the inner peripheral guide surface 9b while the outer peripheral guide surface 9a may be linearly stepped.

Figure 8B:
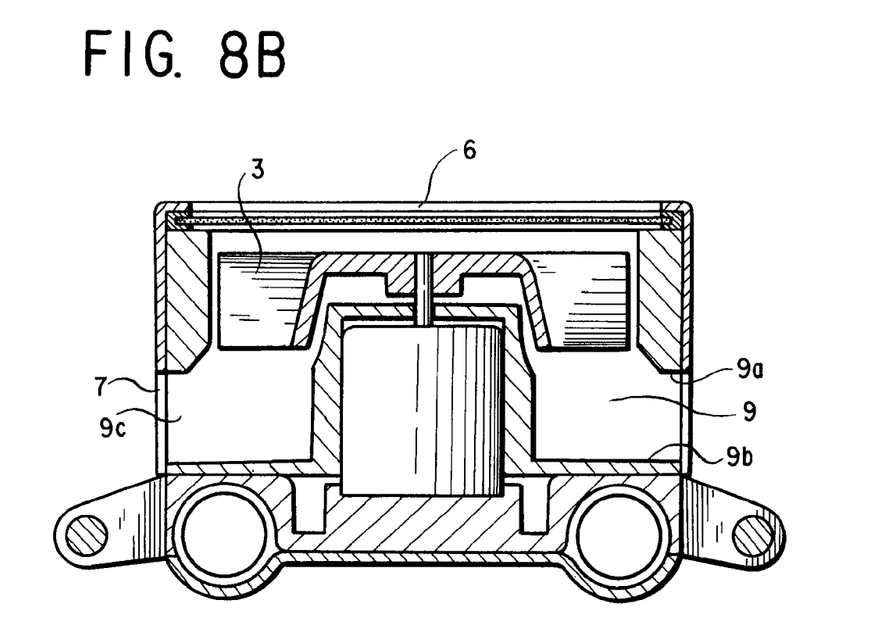
Figure 9:
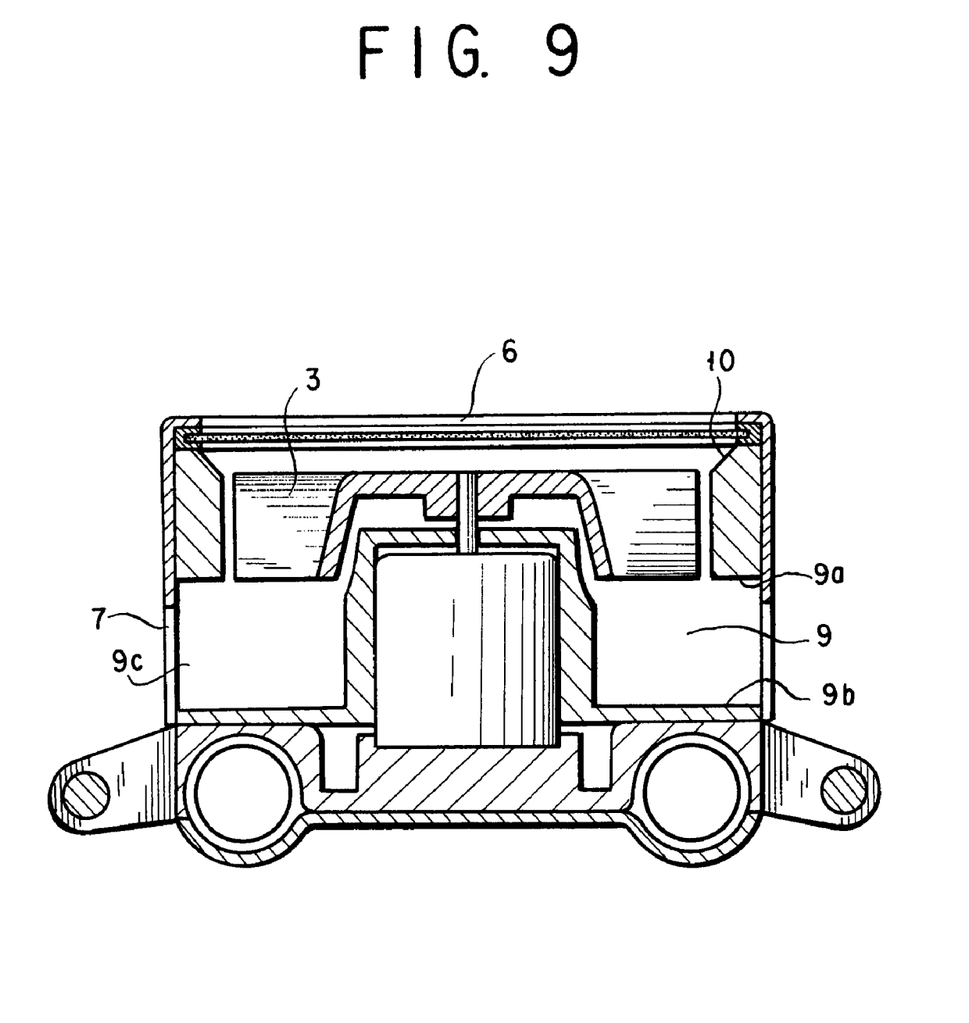
FIG. 9 is a cross sectional view of the apparatus in another form of implementation which is provided only with an intake part.

Also, as shown in FIG. 8B, it may be configured so that air flows smoothly along the outer peripheral guide surface 9a while the inner peripheral surface 9b may be linearly stepped (hook shape).

In short, so that air flows smoothly and without turbulence in the air flow passage 9, either the outer or inner peripheral guide surface 9a or 9b may be, but preferably both are, configured so that air flows smoothly thereon.

Also, while configuring the air intake section 10 in the form of a funnel as mentioned above further improves the air intake efficiency, if the outer and/or inner peripheral guide surfaces 9a in radial section 9b are configured to be linear or linearly stepped it should be noted that configuring the air intake section 10 in the form of a funnel can still improves the air intake efficiency.

Figure 10:
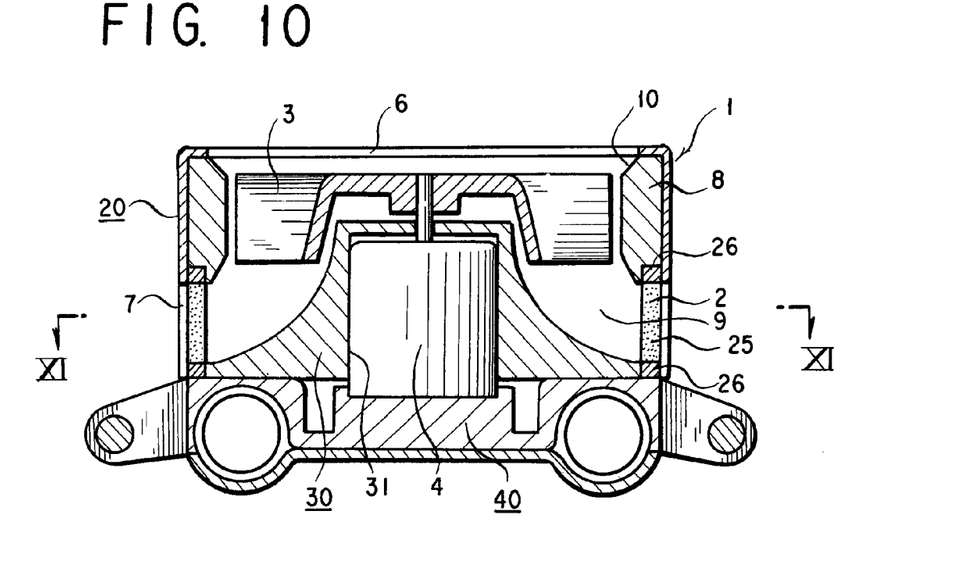
FIG. 10 is a cross sectional view illustrating a further form of implementation of the apparatus in which the chemical carrier is disposed on the side of an outlet.
Figure 11:
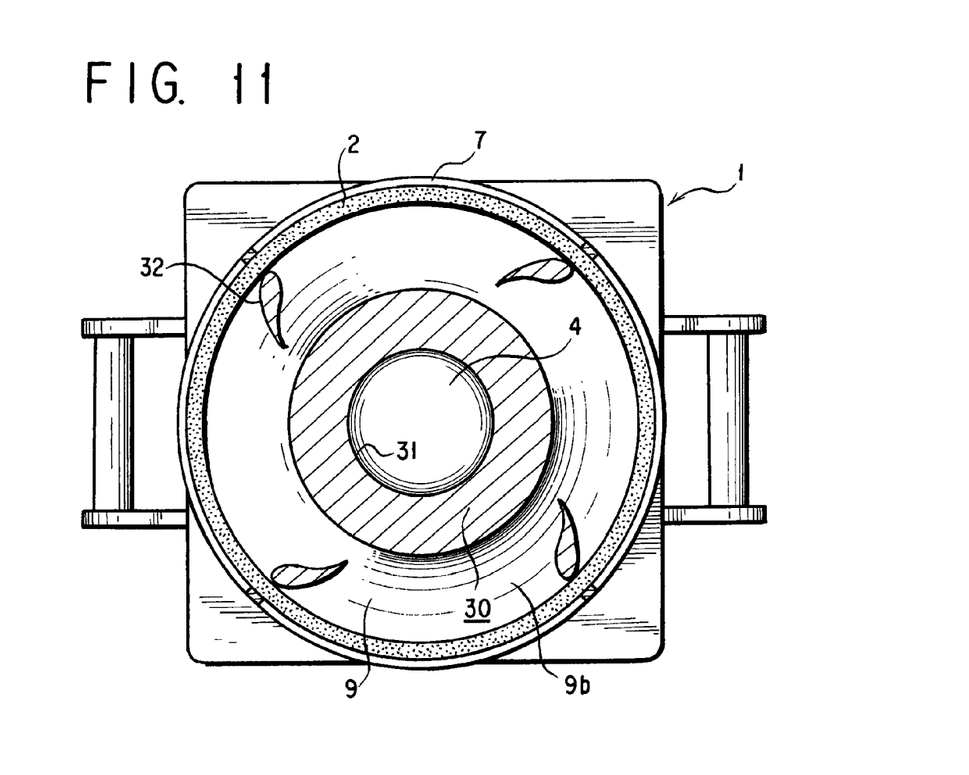
FIG. 11 is a cross sectional view of the apparatus taken along the line X1-X1 in FIG. 10.

While the chemical carrier 2 in the previous form of implementation is disposed on the side of the inlet port 6, it may be disposed on the side of the outlet port 7 as shown in FIGS. 10 and 11.

In this form of implementation, the chemical carrier 2 comprises a ring-shaped honeycomb structural body 25 carrying a chemical and having an upper and a lower plate 26 fastened to a top and a bottom thereof, respectively, and attached to the outlet side section 9c of the air flow passage 9.

Alternatively, the chemical carrier 2 may be disposed at each of the inlet port 6 and outlet port 7 sides.

In short, the chemical retainer 2 may be disposed in at least one region between the inlet port 6 and the axial flow fan 3 and between the axial flow fan 3 and the outlet port 7.

While in the previous form of implementation, the outlet side section 9c of the air flow passage 9 is provided separately of the outlet port 7, air can be discharged directly from the outlet side section 9c so that the latter can serves as the outlet port 7.

Mention is next made of typical texts as Example of a fan type noxious insect control apparatus according to the present invention.

As for the axial flow fan 3, three (3) different types were prepared for a boss diameter $D_2$ and a boss taper angle $\theta$ as shown in Table 1 below.

TABLE 1

| | Axial Flow Fan | | | |
|---|---|---|---|---|
| Model Number | Outer Diameter $D_1$ (mm) | Boss Diameter $D_2$ (mm) | Fan Height $L_2$ (mm) | Boss Taper Angle $\theta$ (°) |
| 1 | 55 | 31 | 12 | 7 |
| 2 | 55 | 31 | 12 | 10 |
| 3 | 55 | 29 | 12 | 11 |

As for the annular wall 8, twelve (12) different types were prepared for an axial length L1, a clearance size c, a size of taper at the air intake section 10 and a size of taper at the outer peripheral guide surface 9a as shown in Table 2 below.

TABLE 2

| | Annular Wall | | | |
|---|---|---|---|---|
| Model Number | Length of Annular Wall $L_1$ (mm) | Clearance Size c (mm) | Size of Air Intake Section $l_1$ (mm) | Size of Outer Peripheral Guide Surface $l_2$ (mm) |
| STD | none | none | none | none |
| 1 | 15 | 1.0 | 0 | 0 |
| 2 | 15 | 0.6 | 0 | 0 |
| 3 | 15 | 1.0 | 0 | 2 |
| 4 | 15 | 1.0 | 0 | 4 |
| 5 | 15 | 1.0 | 2 | 0 |
| 6 | 15 | 1.0 | 4 | 0 |
| 7 | 16 | 1.0 | 0 | 0 |
| 8 | 15 | 0.6 | 2 | 4 |
| 9 | 15 | 1.6 | 0 | 0 |
| 10 | 15 | 3.2 | 0 | 0 |
| 11 | 10 | 1.0 | 0 | 0 |
| 12 | 20 | 1.0 | 0 | 0 |

As for the lower structure, four (4) different types were prepared for a height H1 of the outlet side section and a shape of the inner peripheral guide surface as shown in Table 3 below.

TABLE 3

| | Lower Structure | |
|---|---|---|
| Model Number | Height of Outlet Side Section $H_1$ (mm) | Shape of Inner Peripheral Guide Surface |
| STD | 12 | none |
| 1 | 6 | R |
| 2 | 9.5 | R |
| 3 | 12 | R |
| 4 | 12 | taper |

Here, the model STD (standard) in Tables 2 and 3 above refers to a comparative apparatus.

Figure 12:
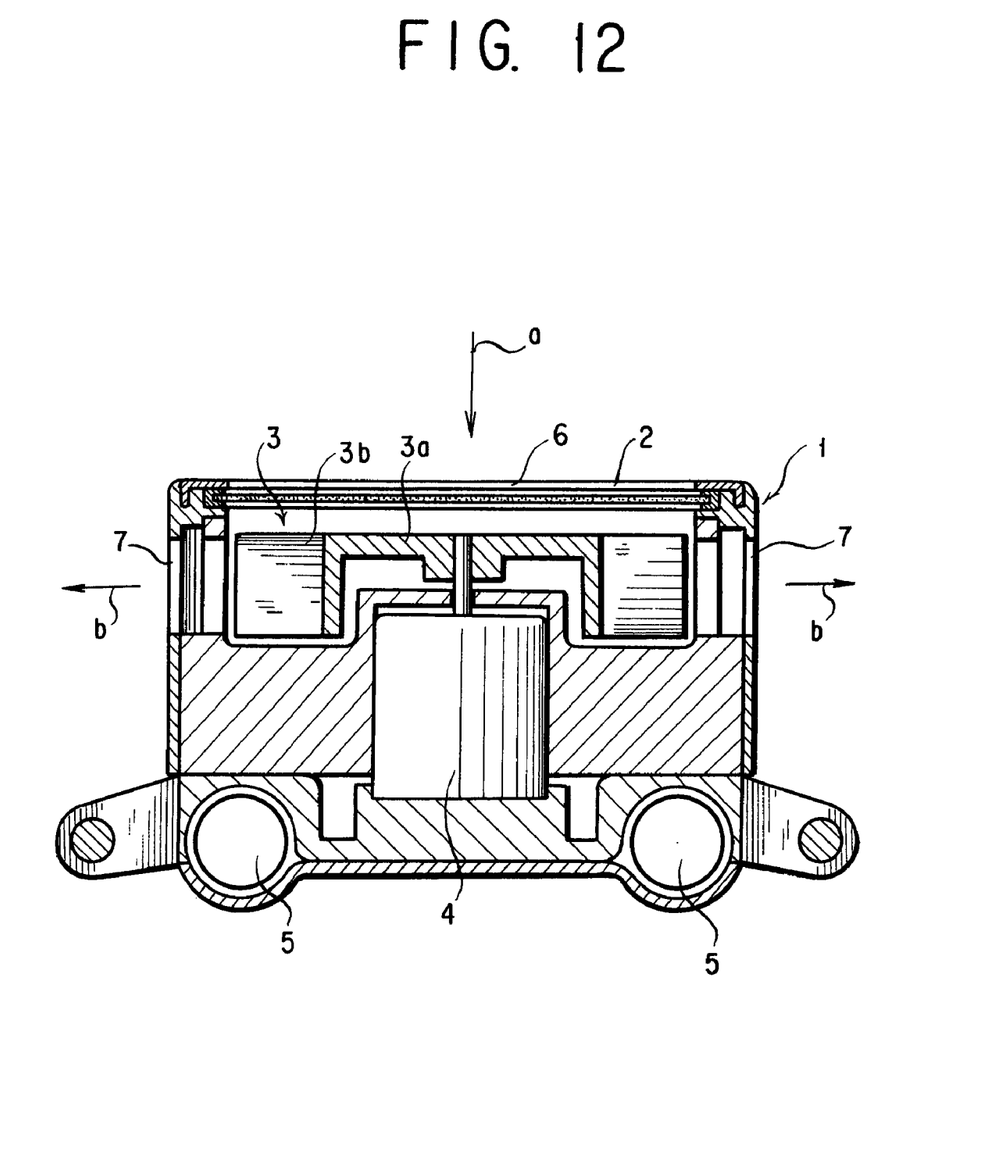
FIG. 12 is a cross sectional view of a comparative apparatus.

The comparative apparatus is a fan type noxious insect control apparatus equivalent to that as disclosed in JP 2001-197856 A mentioned above.

Namely, as shown in FIG. 12 the fan type noxious insect control apparatus in which the outlet port 7 is formed in an area opposed to the blades 3b of the axial flow fan 3 in the fan type noxious insect control apparatus of the present invention whereby air drawn by rotation of the axial flow fan 3 from the inlet port 6 is discharged radially from a region opposed to the blades 3b of the axial flow fan 3 is used as the comparative apparatus.

And, test apparatus No. 1 to No. 12 were prepared using the axial flow fan and the lower structure in model number 1 and the annular wall varied from model number 1 to model number 12 as shown in Table 4 below.

TABLE 4

| | Axial Flow Fan | Annular Wall | Lower Structure | Effectiveness Ratio |
|---|---|---|---|---|
| Comparative Apparatus | 1 | STD | STD | 1.00 |
| Test Appa. No. 1 | 1 | 1 | 1 | 1.43 |
| Test Appa. No. 2 | 1 | 2 | 1 | 1.72 |
| Test Appa. No. 3 | 1 | 3 | 1 | 1.57 |
| Test Appa. No. 4 | 1 | 4 | 1 | 1.79 |
| Test Appa. No. 5 | 1 | 5 | 1 | 1.50 |
| Test Appa. No. 6 | 1 | 6 | 1 | 1.59 |

TABLE 4-continued

|  | Axial Flow Fan | Annular Wall | Lower Structure | Effectiveness Ratio |
| --- | --- | --- | --- | --- |
| Test Appa. No. 7 | 1 | 7 | 1 | 1.67 |
| Test Appa. No. 8 | 1 | 8 | 1 | 2.03 |
| Test Appa. No. 9 | 1 | 9 | 1 | 1.07 |
| Test Appa. No. 10 | 1 | 10 | 1 | 1.02 |
| Test Appa. No. 11 | 1 | 11 | 1 | 1.10 |
| Test Appa. No. 12 | 1 | 12 | 1 | 1.35 |

Likewise, test apparatus Nos. 13 to 15 were prepared using the axial flow fan and the annular wall in model number 1 and the lower structure varied as shown in Table 5 below.

TABLE 5

|  | Axial Flow Fan | Annular Wall | Lower Structure | Effectiveness Ratio |
| --- | --- | --- | --- | --- |
| Comparative Apparatus | 1 | STD | STD | 1.00 |
| Test Appa. No. 1 | 1 | 1 | 1 | 1.43 |
| Test Appa. No. 13 | 1 | 1 | 2 | 1.50 |
| Test Appa. No. 14 | 1 | 1 | 3 | 1.32 |
| Test Appa. No. 15 | 1 | 1 | 4 | 1.17 |

Further, test apparatus Nos. 16 and 17 were prepared using the annular wall and the lower structure in model number 1 and the axial flow fan varied as shown in Table 6 below.

TABLE 6

|  | Axial Flow Fan | Annular Wall | Lower Structure | Effectiveness Ratio |
| --- | --- | --- | --- | --- |
| Comparative Apparatus | 1 | STD | STD | 1.00 |
| Test Appa. No. 1 | 1 | 1 | 1 | 1.43 |
| Test Appa. No. 16 | 2 | 1 | 1 | 1.48 |
| Test Appa. No. 17 | 3 | 1 | 1 | 1.75 |

In the test and comparative apparatus mentioned above, the axial flow fan had an outer diameter D1 of 55 mm, the blades are seven in number, the chemical carrier 2 had a diameter of 64 mm, the motor had an applied voltage of 3.0 V and the axial flow fan had a revolving speed of 1450 rpm, commonly.

Figure 13:
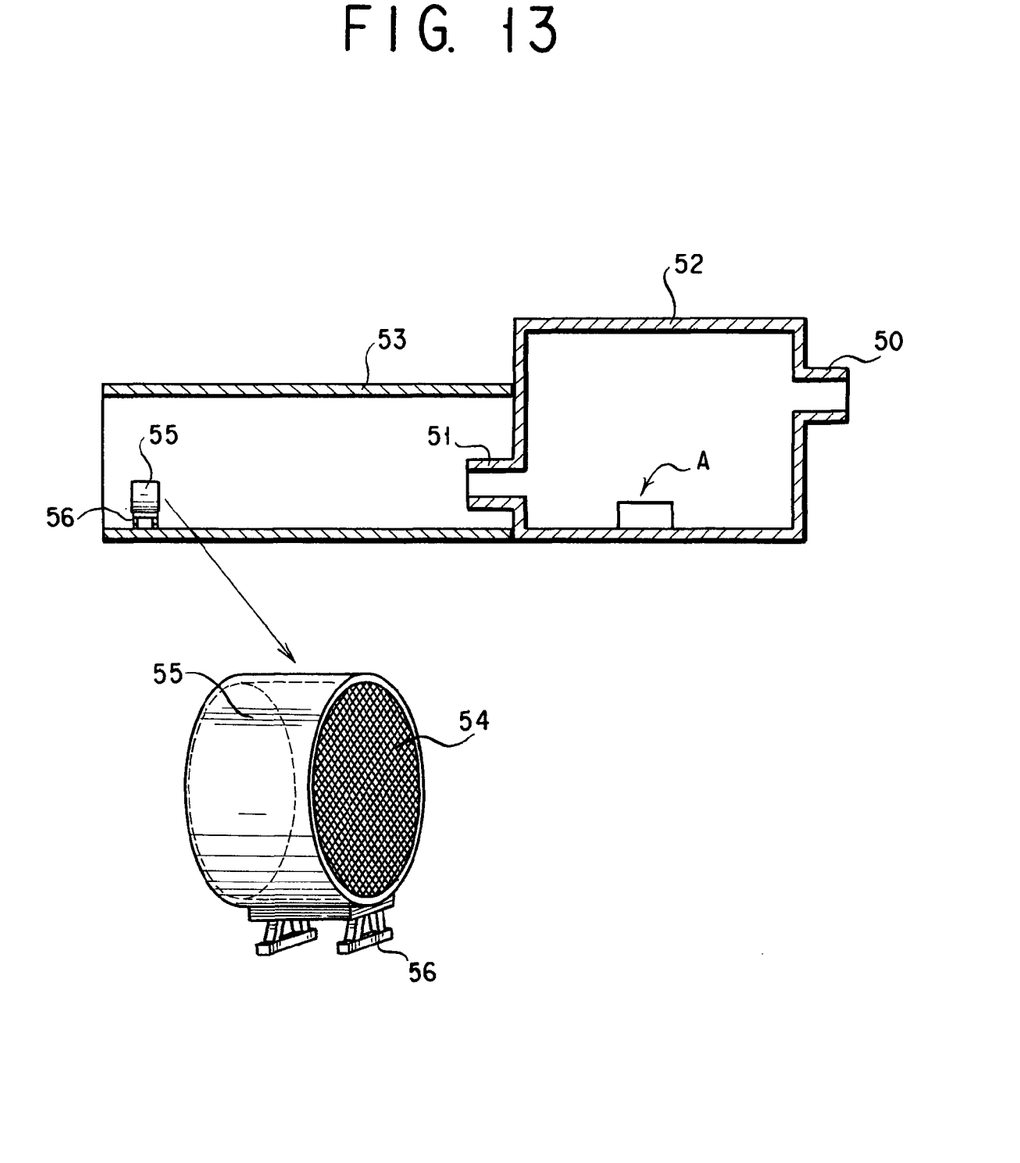
FIG. 13 is an explanatory view of a testing machine.

Tests were conducted using the test and comparative apparatus, as follows:

Insect under test: Musca domestica female adult, the $3^{rd}$ to $5^{th}$ day after eclosion, come of Institute of Infectious Diseases (Institute of Medical Science, University of Tokyo) strain;

Sample chemical: A non-woven fabric filter of 64 mm diameter impregnated with methofluthrin (Sumitomo Chemical Co., Ltd.);

Method of testing: Tests were carried out with a testing machine as shown in FIG. 13.

Testing machine: Each test apparatus, the comparative apparatus A was placed in a box of 520 mm long, 410 mm wide and 340 mm high with an inlet port 50 and an outlet port 51 each of 110 mm inner diameter and the outlet port 51 was connected with the right hand side of a cylinder 53 of 200 mm inner diameter, whereupon a force air flow at 10 L/sec was created by suction by a fan from the left hand side of the cylinder, wherein at a position spaced by a distance of 800 mm from the right hand side end of the cylinder 53 (where the outlet port 51 of the box 52 is connected) and spaced by a distance of 50 mm from the left hand side end of the cylinder 53, a glass ring 55 (of 90 mm outer diameter, 80 mm inner diameter and 60 mm length) with both ends covered with 16 mesh nylon nets 54 in which ten (10) insects under test were let to fly was placed on a rest 56 of 50 mm high. Then, the motor for the test apparatus, the comparative apparatus A was electrically energized.

The number of knock-down insects with lapse of time after the motor energization was examined and the KT50 value was calculated according to the Bliss' probit method. From the KT50 value obtained, an estimate of volatilization of the chemical was derived for effectiveness comparison.

The results are shown in Table 4, 5 and 6.

From the ratio in effectiveness of the test apparatus No. 1 to the comparative apparatus in Table 4, it has been found that providing an annular wall makes the noxious insect control performance excellent.

From the results of test apparatus Nos. 1, 2, 9 and 10 in Table 4, it is seen that the clearance size c which if it is 1.6 mm or more deteriorates the effectiveness ratio is preferably no more than 0.6 mm, namely no more than 3% of the outer diameter $R_1$ of the axial flow fan.

From the results of test apparatus Nos. 1, 3 and 4 in Table 4, it is seen that the outer peripheral guide surface 9a is preferably large in taper.

From the results of test apparatus Nos. 1, 5 and 6 in Table 4, it is seen that the air intake section 10 is preferably large in taper.

From the results of test apparatus Nos. 1, 7, 11 and 12 in Table 4, it is seen that the axial length $L_1$ of the annular wall 8 is preferably 0.8 to 1.7 time of the axial length $L_2$ of the axial flow fan 3.

From the results in table 5, it is seen that the inner peripheral guide surface 9b in radial section is preferably generally arced (R-shaped), rather than simply tapered.

The chemical for use in the present invention is a volatile chemical that may be miticide, repellant to harmful insects, insecticide, insect pest growth control agent or sucking inhibitor.

Such chemicals, if used to kill insects, may be a variety of volatile insecticides so far used or known, of which pyrethroid chemicals can preferably be used as generally high in safety.

Further, such specific chemicals as methofluthrin, transfluthrin, empenthrin and terallethrin which is highly active and which in a small amount exhibit efficaciousness can desirably be used as they can make the chemical carrier thin and small.

The sheet 25 which for use in the present invention is impregnated with a noxious insect control active ingredient may illustratively be of paper, cloth, woven or no-woven fabric or net. The retainers 26 for holding the sheet 25 in position may, for the sake of safety as they are placed, be illustratively of a material such as polyethylene terephthalate, polypropylene, polyethylene, polyacetal, nylon, acrylic, ABS, paper, AS or metal. Further, it is preferred that it be thin having a thickness between 2 and 5 mm and small having an area between 700 and 3000 $mm^2$ in view of portability.

Especially, the non-woven fabric has a weight preferably of 10 to 100 $g/m^2$, more preferably of 20 to 50 $g/m^2$. If the weight exceeds 100 $g/m^2$, its air resistance becomes excessive so that the air flow by the fan can no longer pass through the sheet and becomes unable to diffuse the noxious insect control active ingredient. Conversely, if the weight falls below 10 $g/m^2$, there is then the likelihood that the amount of a chemical that can be retained in the sheet is reduced, reducing its feasibility or resulting in a shortage in amount of the chemical.

The battery used as the power supply for driving the axial flow fan can be one or more of dry cells such as alkaline dry cells of a size AAAA, AAA, AA, C and D, Manganese dry cells of a size AAAA, AAA, AA, C and D, rectangular cells, lithium cells and lithium button cells which can be used singly or in combination in parallel or in series. It may also be a secondary cell chargeable, and may further be not the cell or cells but a domestic power supply (at 100 V AC) using an AC adapter.

What is claimed is:

1. A fan type noxious insect control apparatus comprising:
   an inlet port;
   an outlet port; and
   an axial flow fan; and
   a chemical carrier carrying a noxious insect control active ingredient;
   wherein:
   air is drawn through the inlet port by driving the axial flow fan and passed through the chemical carrier carrying the noxious insect control active ingredient to form air containing the noxious insect control active ingredient, the air being run out through the outlet port to diffuse the noxious insect control active ingredient into an ambient atmosphere;
   the inlet port is upstream of the axial flow fan and is open along an axial direction of the axial flow fan;
   the outlet port is downstream of the axial flow fan and is open along a radial direction of the axial flow fan;

the apparatus further comprises an annular wall for guiding an air flow of the axial flow fan, and an air flow passage communicating between a delivery section of the axial flow fan and the outlet port;

the annular wall has an inner peripheral surface opposing blade tips of the axial flow fan;

the inner peripheral surface is generally circular in cross section perpendicular to an axis thereof and has an air guide section opposing the blade tips of the axial flow fan across a clearance;

the air flow passage is configured so as to convert air flowing out of the axial flow fan in the axial direction thereof to air flowing in the radial direction thereof;

the air flow passage has an outer peripheral guide surface and an inner peripheral guide surface radially opposed to the outer peripheral guide surface, the inner peripheral guide surface extending from a vicinity of a boss of the axial flow fan to the outlet port; and at least one of the outer peripheral guide surface and the inner peripheral guide surface of the air flow passage is of a generally arced shape in a radial section thereof such that air flows smoothly and without turbulence.

2. A fan type noxious insect control apparatus as set forth in claim 1, wherein the inner peripheral surface of the annular wall has an air intake section formed in a region closer to an inlet side thereof than the air guide section, wherein the air intake section is in the form of a funnel gradually increasing in diameter towards the inlet port.

3. A fan type noxious insect control apparatus as set forth in claim 1, wherein the chemical carrier carrying the noxious insect control active ingredient is disposed in at least one of a region between the inlet port and the axial flow fan and a region between the axial flow fan and the outlet port.

4. A fan type noxious insect control apparatus as set forth in claim 1, wherein the clearance formed between the blade tips of the axial flow fan and the air guide section has a size which is not more than 3% of a diameter of the axial flow fan.

5. A fan type noxious insect control apparatus as set forth in claim 1, wherein the annular wall has an axial length which is 0.5 to 1.7 times an axial length of the axial flow fan.

6. A fan type noxious insect control apparatus as set forth in claim 1, wherein the air flow passage has an outlet side section having a size in the axial direction of the axial flow fan that is from 5% to 40% of an outer diameter of said axial flow fan.

7. A fan type noxious insect control apparatus as set forth in claim 2, wherein the chemical carrier carrying the noxious insect control active ingredient is disposed in at least one of a region between the inlet port and the axial flow fan and a region between the axial flow fan and the outlet port.

8. A fan type noxious insect control apparatus as set forth in claim 2, wherein the clearance formed between the blade tips of the axial flow fan and the air guide section has a size which is not more than 3% of a diameter of the axial flow fan.

9. A fan type noxious insect control apparatus as set forth in claim 3, wherein the clearance formed between the blade tips of the axial flow fan and the air guide section has a size which is not more than 3% of a diameter of the axial flow fan.

10. A fan type noxious insect control apparatus as set forth in claim 2, wherein the annular wall has an axial length which is 0.5 to 1.7 times an axial length of the axial flow fan.

11. A fan type noxious insect control apparatus as set forth in claim 3, wherein the annular wall has an axial length which is 0.5 to 1.7 times an axial length of the axial flow fan.

12. A fan type noxious insect control apparatus as set forth in claim 2, wherein the air flow passage has an outlet side section having a size in the axial direction of the axial flow fan that is from 5% to 40% of an outer diameter of the axial flow fan.

13. A fan type noxious insect control apparatus as set forth in claim 3, wherein the air flow passage has an outlet side section having a size in the axial direction of the axial flow fan that is from 5% to 40% of an outer diameter of the axial flow fan.

* * * * *